United States Defensive Publication [19] (H) [11] T100,405

Lund [43] Mar. 3, 1981

[54] PROCESS FOR PRODUCING A POWDERED FLAVORING MATERIAL

[75] Inventor: Eric D. Lund, Winter Haven, Fla.

[73] Assignee: The United States of America as represented by the Secretary of the Navy, Washington, D.C.

[21] Appl. No.: 118,886

[22] Filed: Feb. 6, 1980

[51] Int. Cl.[3] ..... A23L 1/222

[52] U.S. Cl. ..... 426/651

[57] ABSTRACT

A powdered orange flavor containing 27 fold orange oil adsorbed on rice starch was prepared by a menthol treatment process. The powder contained the equivalent flavoring potency of 18% by wt. of whole orange oil, which was the maximum obtainable; other rice starch samples contained lesser amounts and had lower folds. Two other edible polymers, egg albumin and Mor-rex (hydrolyzed cereal solids), also had some capacity, when treated with methanol, for polar orange oil components. These were less suitable than starch, however, because of inadequate concentration on the polymer, a low degree of folding, or distorted oil compositions.

1 Claim, No Sheets Drawing,

11 Pages Specification

The file of this unexamined application may be inspected and copies thereof may be purchased (849 O.G. 1221, Apr. 9, 1968).